United States Patent
Wang et al.

(10) Patent No.: US 10,877,822 B1
(45) Date of Patent: Dec. 29, 2020

(54) ZERO-COPY PACKET TRANSMISSION BETWEEN VIRTUALIZED COMPUTING INSTANCES

(71) Applicant: VMware, Inc., Palo Alto, CA (US)

(72) Inventors: Yusheng Wang, Beijing (CN); Miao Yan, Beijing (CN); Dousheng Zhao, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/780,870

(22) Filed: Feb. 3, 2020

(30) Foreign Application Priority Data

Dec. 16, 2019 (WO) ................ PCT/CN2019/125614

(51) Int. Cl.
| | | |
|---|---|---|
| G06F 9/44 | (2018.01) | |
| G06F 9/54 | (2006.01) | |
| G06F 9/455 | (2018.01) | |
| G06F 21/64 | (2013.01) | |
| G06F 21/52 | (2013.01) | |

(52) U.S. Cl.
CPC .......... *G06F 9/544* (2013.01); *G06F 9/45545* (2013.01); *G06F 9/542* (2013.01); *G06F 21/52* (2013.01); *G06F 21/64* (2013.01); *G06F 2221/033* (2013.01)

(58) Field of Classification Search
CPC ....................................................... G06F 9/544
USPC ........................................................ 719/312
See application file for complete search history.

(56) References Cited

U.S. PATENT DOCUMENTS

| | | | | |
|---|---|---|---|---|
| 2011/0122884 A1* | 5/2011 | Tsirkin | .................... | G06F 9/545 370/412 |
| 2014/0149981 A1* | 5/2014 | Luxenberg | .......... | H04L 49/9005 718/1 |
| 2016/0085577 A1* | 3/2016 | Gray | ....................... | H04L 49/70 718/1 |

* cited by examiner

*Primary Examiner* — Timothy A Mudrick
(74) *Attorney, Agent, or Firm* — Su IP Consulting (57) ABSTRACT

Example methods are provided for a host to perform zero-copy packet transmission. On example method may comprise allocating a transmit (TX) packet buffer to a first virtualized computing instance and a receive (RX) packet buffer to a second virtualized computing instance, wherein the TX packet buffer and the RX packet buffer are both mapped to a shared memory location associated with the host. The method may also comprise: accessing, by the first virtualized computing instance, the TX packet buffer to store a packet in the shared memory location; processing, by the forwarding element, the packet in the shared memory location; and accessing, by the second virtualized computing instance, the RX packet buffer to receive the packet stored in the shared memory location.

21 Claims, 6 Drawing Sheets

ZERO-COPY PACKET TRANSMISSION BETWEEN VIRTUALIZED COMPUTING INSTANCES

CROSS-REFERENCE TO RELATED APPLICATION

The present application, U.S. application Ser. No. 16/780,870, claims the benefit of Patent Cooperation Treaty (PCT) Application No. PCT/CN2019/125614, filed Dec. 16, 2019, which is incorporated herein by reference

BACKGROUND

Virtualization allows the abstraction and pooling of hardware resources to support virtualization computing instances such as guest virtual machines (VMs) in a Software-Defined Networking (SDN) environment, such as a Software-Defined Data Center (SDDC). For example, through server virtualization, VMs running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, VMs supported by the same host may communicate via a forwarding element (e.g., virtual switch) connecting them. It is desirable to implement packet transmission between VMs on the same host efficiently to improve performance and throughput.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to implementation of service chains will now be explained in more detail using FIG. 1, which is a schematic diagram illustrating example Software-Defined Networking (SDN) environment 100 in which zero-copy packet transmission may be performed. It should be understood that, depending on the desired implementation, SDN environment 100 may include additional and/or alternative components than that shown in FIG. 1.

Figure 1:
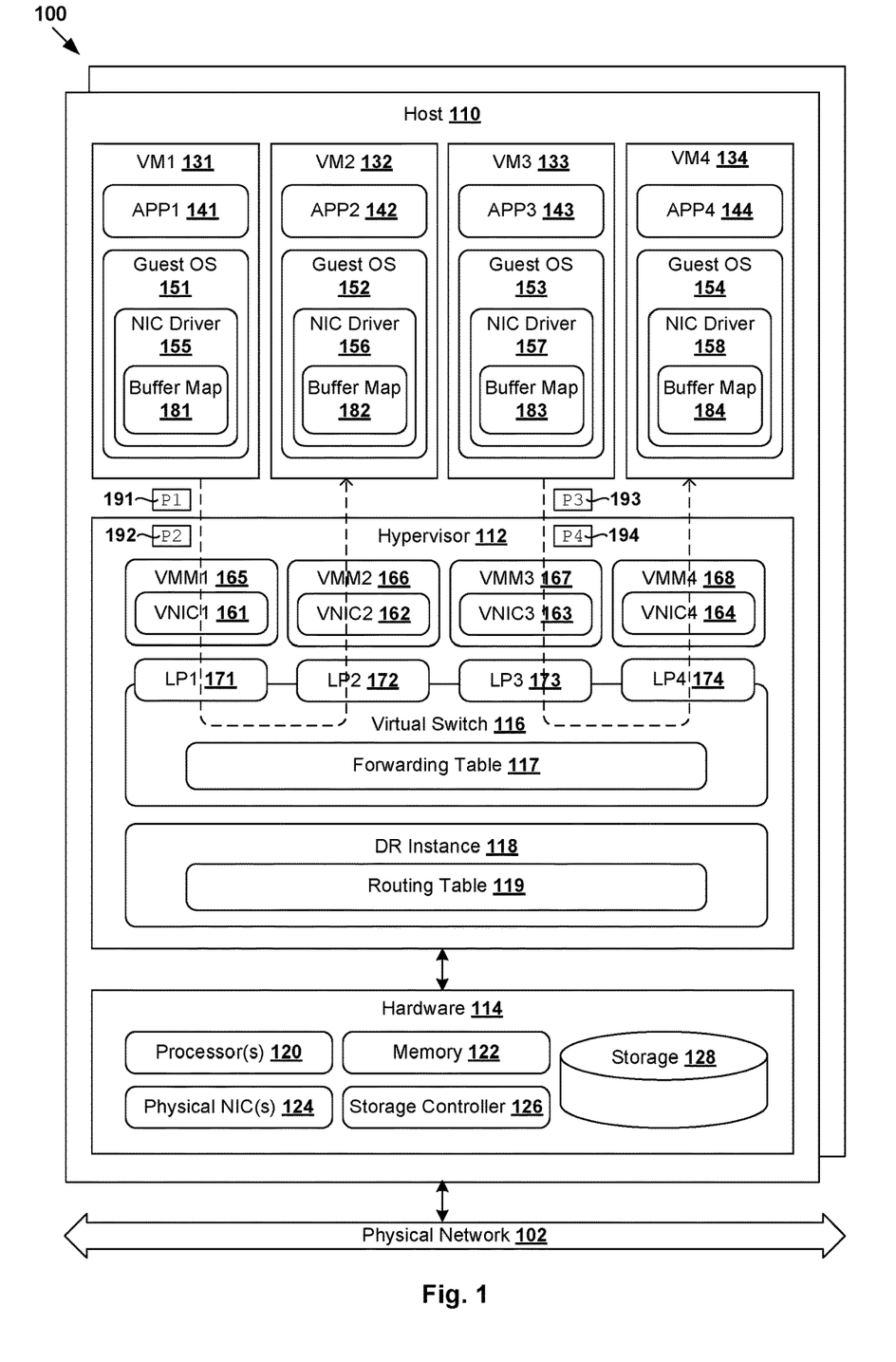
FIG. 1 is a schematic diagram illustrating an example Software-Defined Networking (SDN) environment in which zero-copy packet transmission may be performed.

In the example in FIG. 1, virtualized computing environment 100 includes multiple hosts 110 (one shown in detail for simplicity; also known as "computer systems", "host computers", "host devices", "physical servers", "server systems", etc.) that are connected to physical network 102. Each host 110 includes suitable virtualization software (e.g., hypervisor 112) and hardware 114 to support guest virtual machines (VMs), such as VM1 131, VM2 132, VM3 133 and VM4 134. Although one host 110 and four VMs 131-134 are shown for simplicity, there may be multiple hosts in virtualized computing environment 100, each supporting tens or hundreds of virtual machines in practice.

Each host 110 is connected with management entity or entities via physical network 102. For example, SDN controller (not shown) is an example management entity that facilitates management and configuration of various objects in SDN environment 100, such as hosts 110, VMs 131-134, etc. One example of an SDN controller is the NSX controller component of VMware NSX® (available from VMware, Inc.) that may be a member of a controller cluster (not shown) and configurable using an SDN manager (not shown for simplicity). One example of an SDN manager is the NSX manager component that provides an interface for end users to perform any suitable configuration in SDN environment 100. In practice, a management entity may be implemented using physical machine(s), virtual machine(s), a combination thereof, etc. Users (e.g., network administrators) may access the functionalities of the SDN manager and/or SDN controller via any suitable interface, such as graphical user interface, command-line interface, Application Programming Interface (API) calls. The SDN controller may send configuration information to host 110 via a control-plane channel established between them.

Hypervisor 112 maintains a mapping between underlying hardware 114 of host 110 and virtual resources allocated to respective VMs 131-134. Hardware 114 includes suitable physical components, such as central processing unit(s) or processor(s) 120A; memory 122; physical network interface controllers (NICs) 124; storage controller 126; and storage disk(s) 128, etc. Virtual resources are allocated to VMs 131-134 to support respective applications (see "APP1" to "APP4") 141-144 and guest operating systems (OS) 151-154. In practice, VMs 131-134 may be each deployed to support any suitable application, such as web server, database server, application server, virtualized network function(s) from a service provider (e.g., as part of a service chain), etc.

Virtual resources are allocated to VMs 131-134 to support respective guest operating systems (OS) 151-154 and applications 155-158. For example, corresponding to hardware 114, the virtual resources may include virtual CPU, guest physical memory (i.e., memory visible to the guest OS running in a VM), virtual disk(s), virtual network interface controller (VNIC), etc. Virtual machine monitors (VMMs) 165-168 are implemented by hypervisor 112 to emulate hardware resources for VMs 131-134. For example, VMM1 165 is configured to emulate VNIC1 161 to provide network access for VM1 131, and VMMs 166-168 to emulate respective VNICs 162-164 for VMs 132-134. In practice, VMMs 165-168 may be considered as components that are part of respective VMs 131-134, or alternatively, separated from VMs 131-134. In both cases, VMMs 165-168 each maintain the state of respective VNICs 161-164 for various functions, such as to facilitate migration of respective VMs 131-134. In practice, one VM may be associated with multiple VNICs (each VNIC having its own network address).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc. Hypervisor 112 may implement any suitable virtualization technology, such as VMware ESX® or ESXi™ (available from VMware, Inc.), Kernel-based Virtual Machine (KVM), etc.

Hypervisor 112 further implements virtual switch 116 to handle traffic and logical distributed router (DR) instance 118 to handle egress from, and ingress packets to, corresponding VMs 131-134. In practice, virtual switch 116 may form a distributed virtual switch (DVS) with other virtual switches (not shown for simplicity) in SDN environment 100. In this case, the DVS represents a collection or aggregation of different virtual switches implemented on different hosts 110. In practice, the DVS may be implemented using any suitable technology, such as vSphere® Distributed Switch™ (a trademark of VMware, Inc.), etc. The DVS, being a software abstraction, may be implemented using multiple components distributed in different hardware.

In SDN environment 100, logical switches and logical DRs may be implemented in a distributed manner and can span multiple hosts to connect VMs 131-134 with other VMs (not shown) on other host(s). For example, logical switches that provide logical layer-2 connectivity may be implemented collectively by multiple virtual switches (including 116) and represented internally using forwarding tables (including 117) at respective virtual switches. Forwarding table 116 may include entries that collectively implement the respective logical switches. Further, logical DRs that provide logical layer-3 connectivity may be implemented collectively by multiple DR instances (including 118) and represented internally using routing tables (including 119) at respective DR instances. Routing table 119 may each include entries that collectively implement the respective logical DRs.

VMs 131-134 may send egress (i.e., outgoing) packets and receive ingress packets (i.e., incoming) via respective VNICs 161-164 and logical ports 171-174. As used herein, the term "logical port" may refer generally to a port on a logical switch to which a virtualized computing instance is connected. A "logical switch" may refer generally to an SDN construct that is collectively implemented by multiple virtual switches, whereas a "virtual switch" may refer generally to a software switch or software implementation of a physical switch. In practice, there is usually a one-to-one mapping between a logical port on a logical switch and a virtual port on virtual switch 116. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through virtualization of networking services in SDN environment 100, logical overlay networks may be provisioned, changed, stored, deleted and restored programmatically without having to reconfigure the underlying physical hardware architecture. A logical overlay network (also known as "logical network") may be formed using any suitable tunneling protocol, such as Generic Network Virtualization Encapsulation (GENEVE), Virtual eXtensible Local Area Network (VXLAN), Stateless Transport Tunneling (STT), Virtual Local Area Network (VLAN), etc. As used herein, the term "packets" may refer generally to a group of bits that can be transported together from a source to a destination, such as "segments," "frames," "messages," "datagrams," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models. Physical network 102 may be any suitable network, such as wide area network, virtual private network (VPN), etc.

Figure 2:
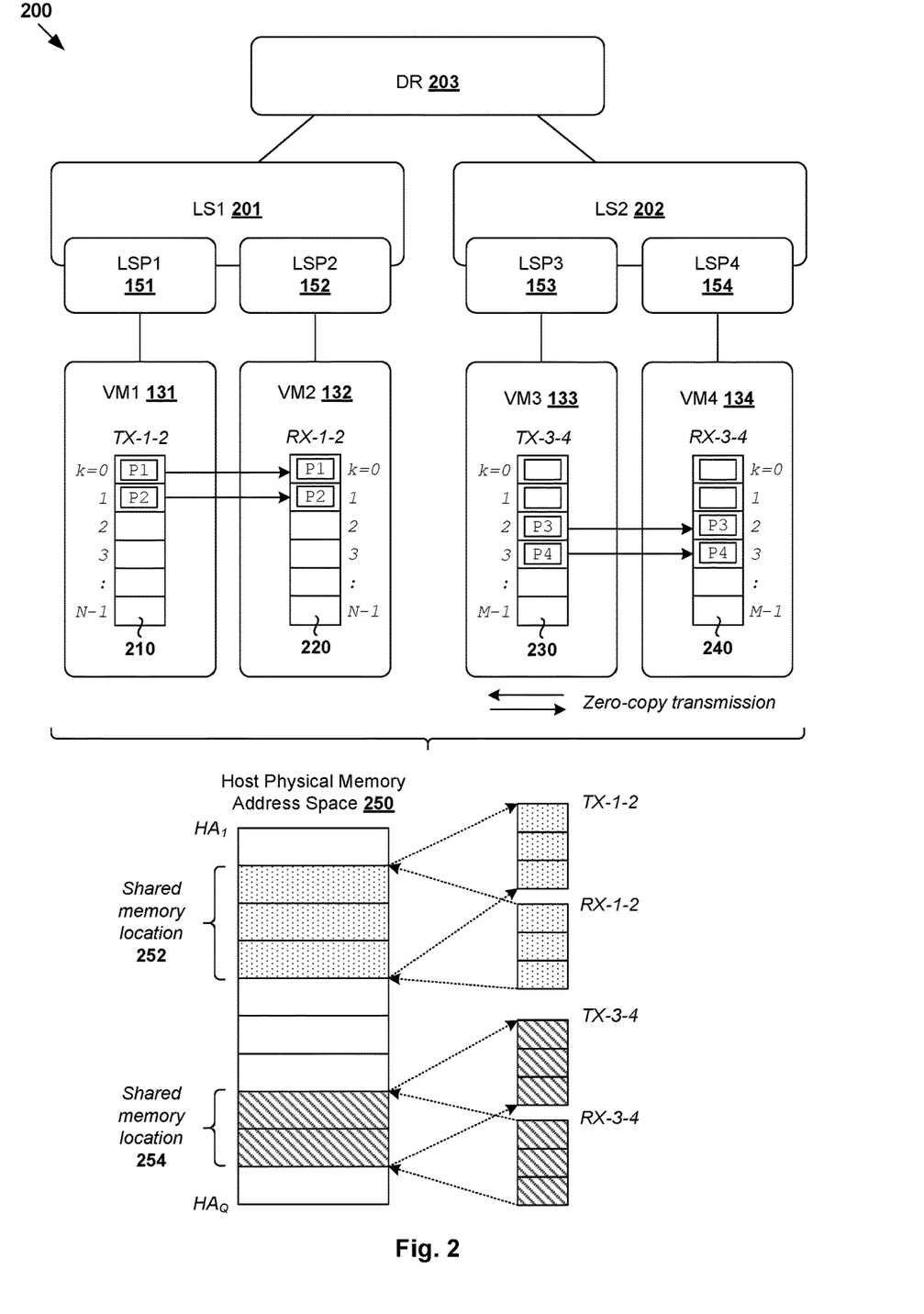
FIG. 2 is a schematic diagram illustrating an example management plane view of the SDN environment in FIG. 1.

FIG. 2 is a schematic diagram illustrating example management plane view 200 of SDN environment 100 in FIG. 1. Here, VM1 131 and VM2 132 are located on a first logical layer-2 segment associated with virtual network identifier (VNI)=5000 and connected to a first logical switch (see "LS1" 201). VM3 133 and VM4 134 are located on a second logical layer-2 segment associated with VNI=6000 and connected to a second logical switch (see "LS2" 202). A logical DR (see "DR" 203) connects logical switches 201-202 to facilitate communication among VMs 131-134 on different segments. With the growth of infrastructure-as-a-service (IaaS), multiple logical overlay networks may be deployed to support multiple tenants in SDN environment 100. In this case, each logical overlay network may be designed to be an abstract representation of a tenant's network in SDN environment 100.

Conventionally, when VM1 131 sends egress packets, VM1 131 will place the packets in a transmit (TX) packet buffer allocated to VM1 131. If the packets are destined for VM2 132 located on same host 110, hypervisor 112 will copy the packets to a receive (RX) packet buffer allocated to VM2 132. This approach lacks efficiency and affects throughput, especially when there is a large number of packets being transmitted between various source VMs and destination VMs on host 110. Since it is not necessary for these packets to leave host 110 via physical NIC(s) 124, it is desirable to improve such intra-host packet transmissions.

Zero-Copy Packet Transmission

According to examples of the present disclosure, intra-host packet transmission between VMs supported by the same host may be performed more efficiently using a "zero-copy" approach. As used herein, the term "zero-copy" may refer generally to an approach where a source stores a packet in a particular memory location for access by a destination during packet transmission, and the packet is not copied from one memory location to another. Examples of the present disclosure may be implemented for zero-copy packet transmissions among virtualized computing instances (e.g., VMs 131-134) connected to the same virtual switch 116 supported by hypervisor 112 and host 110.

Figure 3:
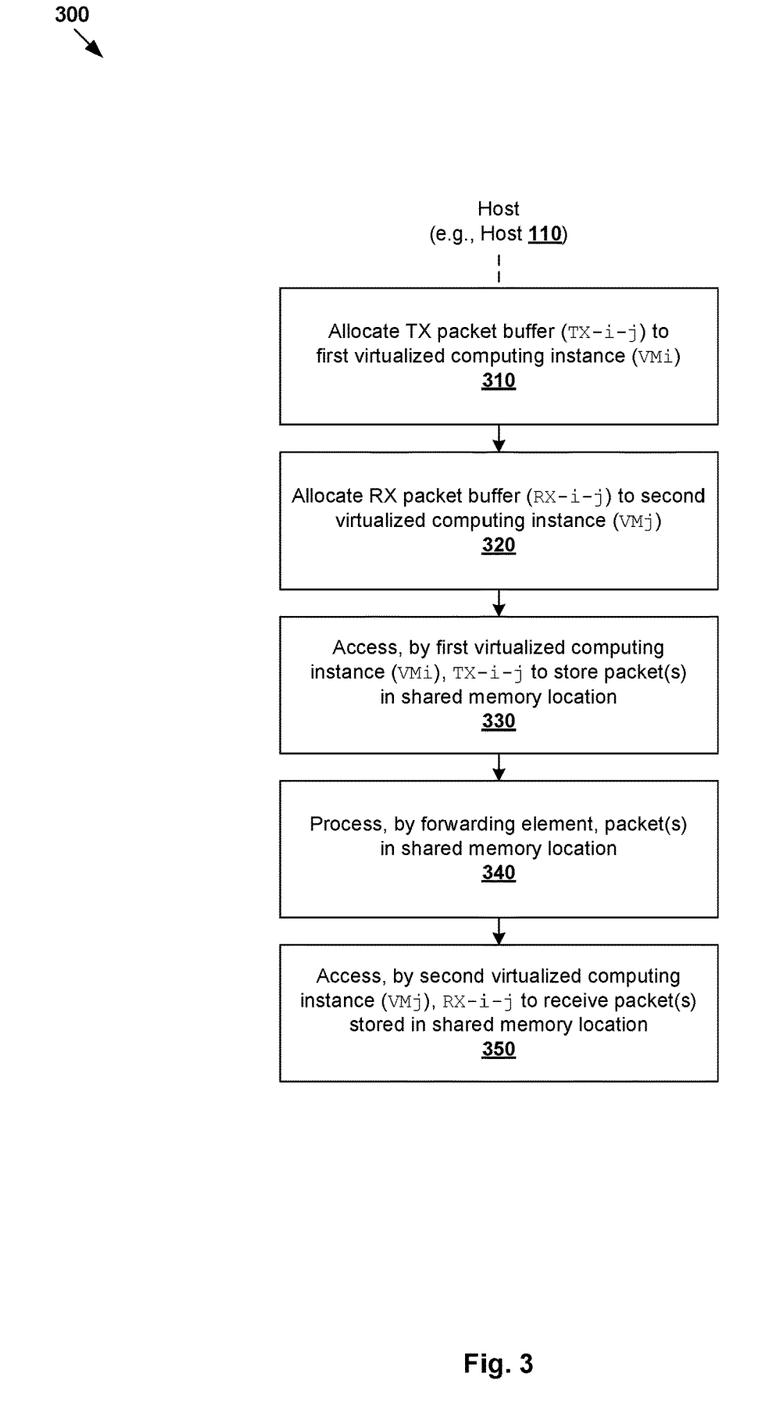
FIG. 3 is a flowchart of an example process for a host to perform zero-copy packet transmission in an SDN environment.

In more detail, FIG. 3 is a flowchart of example process 300 for host 110 to perform zero-copy packet transmission in SDN environment 100. Example process 300 may include one or more operations, functions, or actions illustrated by one or more blocks, such as 310 to 350. The various blocks may be combined into fewer blocks, divided into additional blocks, and/or eliminated depending on the desired implementation. Throughout the present disclosure, various examples will be explained using VMs 131-134 as example "virtualized computing instances," and virtual switch 116 or hypervisor 112 as an example "forwarding element" connecting VMs 131-133.

At 310 and 320 in FIG. 3, a transmit (TX) packet buffer may be allocated to VM1 131 ("first virtualized computing instance") and a receive (RX) packet buffer to VM2 132 ("second virtualized computing instance"). In the example in FIG. 2, source VM1 131 and destination VM2 132 are allocated with respective TX packet buffer 210 (labelled "TX-1-2") and RX packet buffer 220 (labelled "RX-1-2") that are mapped to shared memory location 252 associated with host 110. For example, shared memory location 252 may be a subset of physical memory address space 250 of underlying physical memory 122 of host 110. In practice, TX packet buffer 210 may belong to a first guest memory address space, which is different to a second guest memory address space in which RX packet buffer 220 belongs.

At 330 in FIG. 3, VM1 131 may access TX packet buffer 210 to store packets (see "P1" and "P2") in shared memory location 252, the packets being addressed from source VM1 131 to destination VM2 132. At 340, virtual switch 116 connecting VM1 131 and VM2 132 may process packets "P1" and "P2" stored in shared memory location 252. At 350, VM2 132 may access RX packet buffer 220 to receive processed packets "P1" and "P2" stored in shared memory location 252. In practice, TX packet buffer 210 may only be writable by VM1 131, and RX packet buffer 220 readable by VM2 132. See also 191-192 in FIG. 1.

In contrast with conventional approaches, it is not necessary to copy packets "P1" and "P2" from one packet buffer to another. Instead, since VM1 131 to VM2 132 are supported by same host 110, a zero-copy approach is implemented using source VM1 131 to store packets "P1" and "P2" in shared memory location 252, and virtual switch 116 and destination VM2 132 to access the packets from the same location 252. Using a zero-copy approach, the efficiency of virtual switch 116 may be improved, leading to higher throughput and lower latency. Further, since it is not necessary to utilize CPU cycles to copy packets from one buffer to another, CPU utilization may be reduced, thereby increasing CPU availability for other operations.

In the example in FIG. 2, zero-copy packet transmission may be implemented for a second pair of VMs 133-134. In particular, source VM3 133 and destination VM4 134 may be allocated with respective TX packet buffer 230 (labelled "TX-3-4") and RX packet buffer 240 (labelled "RX-3-4") that are mapped to shared memory location 254. Similarly, shared memory location 254 may be a subset of physical memory address space 250 of underlying physical memory 122 of host 110. When sending traffic to VM4 134, VM3 133 may access TX packet buffer 230 to store packets "P3" and "P4" in shared memory location 254. This way, virtual switch 116 and destination VM4 134 may access shared memory location 254 to process or receive packets "P3" and "P4" according to the example in FIG. 3. See also 193-194 in FIG. 1.

According to examples of the present disclosure, zero-copy packet transmission may be implemented between untrusted guest VMs. In particular, host 110 does not assume that VMs 131-134 are trusted or cooperative. To mitigate security risks, block 340 may involve virtual switch 116 generating digest information associated with the packet prior to sending a notification to VM2 132 to cause VM2 132 to access RX packet buffer 220. Based on the digest information, virtual switch 116 may perform security analysis to determine whether VM1 131 and/or packets "P1" and "P2" are malicious. Various examples will be discussed further below using FIG. 4, FIG. 5 and FIG. 6.

Zero-Copy Packet Transmission (VM1 131 and VM2 132)

Figure 4:
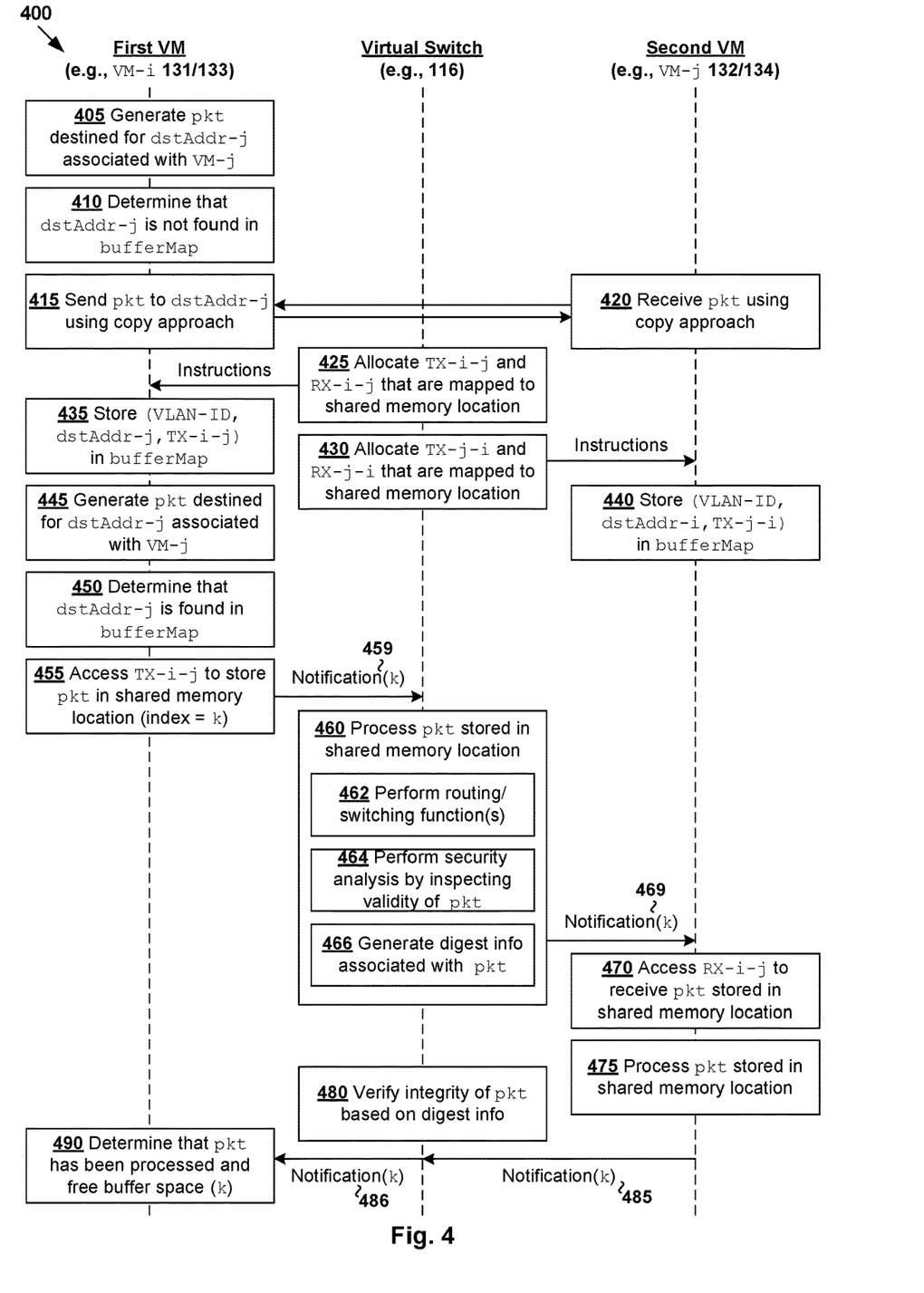
FIG. 4 is a flowchart of an example detailed process for a host to perform zero-copy packet transmission in an SDN environment.

FIG. 4 is a flowchart of example detailed process 400 of zero-copy packet transmission in SDN environment 100. Example process 400 may include one or more operations, functions, or actions illustrated by one or more blocks, such as 405 to 490. The various blocks may be combined into fewer blocks, divided into additional blocks, and/or eliminated depending on the desired implementation. Some examples will be explained using FIG. 5, which is a schematic diagram illustrating first examples 500 of zero-packet transmission in SDN environment 100.

As used herein, the term "packet buffer" may refer generally to any suitable storage, memory, cache and/or other data structure for storing packets temporarily. Any suitable structure may be used to implement the packet buffer, such as a ring buffer, non-ring buffer (e.g., linked list), etc. In practice, a ring buffer (also known "circular buffer," "circular queue" and "cyclic buffer") may refer generally to a circular data structure that is connected end-to-end to allow sections of the ring buffer to be reused. For an example ring buffer with N sections, a first packet may be stored in a first section associated with k=0 of the ring buffer, a second packet at a second section with k=1, and so on until k=N−1. Once the first section (k=0) is freed and becomes available, it may be reused to store a subsequent packet.

In the following, "TX-i-j" will be used to denote a TX packet buffer allocated to VM-i ("first virtualized computing instance") to transmit packets to VM-j ("second virtualized computing instance"), and "RX-i-j" to denote an RX packet buffer allocated to VM-j to receive packets from VM-i. To track different packet buffers, each transmitting VM-i may maintain a buffer map that associates TX-i-j with attribute information associated with VM j, such as VLAN ID, destination MAC and/or IP address information (denoted as dstAddr-j), etc. For example in FIG. 1, VMs 131-134 may maintain buffer maps 181-184 using respective para-virtualized NIC driver instances 155-158. Here, the term "para-virtualized" may refer generally to a guest NIC driver instance knowing that it is running inside hypervisor 112 and not interacting with actual hardware 114 of host 110. In cases where ring buffers are used, buffer maps 181-184 may be known as ring buffer maps.

Although the examples below allocate one TX packet buffer (TX-i-j) and one RX packet buffer (RX-i-j) to each pair of communicating VMs (VM-i, VM-j), it should be understood that multiple TX packet buffers and multiple RX packet buffers may be allocated for scaling purposes. Further, a guest VM may have several VNICs and run several NIC driver instances. In this case, TX packet buffer(s) and RX packet buffer(s) may be allocated to facilitate communication between each VNIC-pair associated with respective VM-i and VM j.

(a) Packet Buffer Allocation

Consider a first scenario where VM1 131 transmits packets to VM2 132. At 405 and 410 in FIG. 4, in response to generating a prior packet "P0" that is destined for VM2 132, VM1 131 may determine whether TX-i-j (where i=1 and j=2) has been allocated to facilitate zero-copy packet transmission. Block 410 may involve searching for an entry matching (VLAN ID=10, MAC address=MAC-2, IP address=IP-2) associated with VM2 132. At 415 and 420, since there is no matching entry, VM1 131 sends packet "P0" using the conventional copy method, which involves copying the packet from one memory location to another memory location for retrieval by VM2 132.

At 425 in FIG. 4, virtual switch 116 may handle prior packet "P0" using conventional approach, but instruct VM1 131 and VM2 132 to use a zero-copy approach for subsequent packets. This involves allocating TX packet buffer 210 (TX-1-2) that is writable by VM1 131 and RX packet buffer 220 (RX-1-2) that is readable by VM2 132. In the example in FIG. 5, TX packet buffer 210 and RX packet buffer 220 may each have N sections that are indexed using k=0, . . . , N−1. TX packet buffer 210 and RX packet buffer 220 may be considered to be a shared packet buffer mapped to the same physical memory location. Any data that is written into TX packet buffer 210 will be readable from RX packet buffer 220 without any copying involved.

Depending on the desired implementation, the allocation in blocks 425-430 may be performed after detecting prior packet "P0" from VM1 131 to VM2 132, such as when the packet is seen for the first time by virtual switch 116. Alternatively or additionally, virtual switch 116 may monitor packet-related metric(s) associated with the traffic flow, such as packet rate, number of packets, duration and frequency of communication, etc. In this case, in response to detecting that a packet-related metric exceeds a predetermined threshold, virtual switch 116 may determine that buffer allocation is required to improve packet transmission efficiency.

At 430 in FIG. 4, virtual switch 116 may also allocate packet buffers for the return traffic from VM2 132 to VM1 131. This involves allocating TX packet buffer 520 (see TX-2-1 in FIG. 5, where j=2 and i=1) to VM2 132 and RX packet buffer 510 (see RX-2-1 in FIG. 5) to VM1 131. Similarly, packet buffers 510-520 are mapped to the same shared memory location within the underlying physical memory space associated with host 110. In the example in FIG. 5, TX packet buffer 520 and RX packet buffer 510 may each have A>0 sections that are indexed using k=0, . . . , A−1.

At 435 and 440 in FIG. 4, based on instructions from virtual switch 116, VM1 131 and VM2 132 may update respective buffer maps 181-182. In the example in FIG. 5, VM1 131 may update buffer map 181 to add an entry that maps TX buffer 210 (TX-1-2) to (VLAN ID=10, MAC-2, IP-2) associated with destination VM2 132. For the return traffic, VM2 132 may update buffer map 182 to add an entry that maps TX buffer 520 (TX-2-1) to (VLAN ID=10, MAC-1, IP-1) associated with destination VM1 131. In practice, an aging mechanism may be implemented to remove an entry in buffer map 181/182 after a predetermined period of time during which no traffic is sent between VM1 131 and VM2 132.

(b) TX Packet Buffer

At 445 in FIG. 4, VM1 131 may generate packets "P1" and "P2" that are destined for VM2 132. At 450, when packets "P1" and "P2" reach NIC driver 155, VM1 131 may examine their destination address information and search buffer map 181 for an entry matching (VLAN ID=10, MAC-2, IP-2) associated with VM2 132. At 455, based on the matching entry added at block 435, VM1 131 may access TX packet buffer 210 (TX-1-2) to store or write packets "P1" and "P2" in shared memory location 252 that is mapped to both TX packet buffer 210 (TX-1-2) and RX packet buffer 220 (RX-1-2). VM1 131 may also generate and send a first notification (see 459) to virtual switch 116 to indicate that packets "P1" and "P2" have been stored in TX packet buffer 210. First notification 459 may identify sections with respective indices k=0 and k=1 in which the packets are stored.

(c) Security Analysis for Untrusted Guest VMs

At 460 in FIG. 4, in response to detecting first notification 459 from VM1 131, virtual switch 116 may process packets "P1" and "P2" according any suitable approach. In particular, at 462, virtual switch 116 may perform switching/routing function(s) based on physical and/or logical network configuration associated with VM1 131 and/or VM2 132. For example, virtual switch 116 may identify that VM1 131 and VM2 132 are connected via logical switch LS1 201 in FIG. 2 and forward the packets accordingly. Virtual switch 116 may perform packet forwarding based on any other switch configuration, such as I/O control, etc. In practice, switch functionalities may be divided into two categories: routing and non-routing. Using examples of the present disclosure, some routing functions may be implemented by VM1 131 (e.g., using NIC driver 155) while others are implemented by virtual switch 116.

Further, virtual switch 116 may process packets "P1" and "P2" by performing security analysis. At 464 in FIG. 4, for example, virtual switch 116 may inspect the validity of packets "P1" and "P2," such as by examining the validity of their source information (e.g., VLAN ID, source MAC address, source IP address) and destination information (e.g., VLAN ID, destination MAC address, destination IP address). Additionally, based on entry=(TX-1-2, 10, MAC-2, IP-2) in buffer map 181, virtual switch 116 may determine that those packets match with the buffer map configuration (e.g., valid usage of TX packet buffer 210).

At 466 in FIG. 4, virtual switch 116 may generate a digest associated with each packet based on attribute(s) associated with the packet. Here, the term "digest" or "digest information" may refer generally to any suitable data to facilitate integrity verification. For example, the digest may be generated based on sensitive attributes, such as packet length, packet type, port number(s), source/destination address information, protocol information, etc. Any other packet header and/or payload information may also be used.

Depending on the desired implementation, virtual switch 116 may also check whether packets "P1" and "P2" may be handled in place, such as a unicast packet that does not require extra header and/or tail padding. If they cannot be handled in place, convention copy approach is used instead. Virtual switch 116 may also alter, buffer or drop the packets. Once processing has been completed, virtual switch 116 may generate and send a second notification (see 469) to VM2 132. Second notification 469 may identify sections with respective indices k=0 and k=1 of RX packet buffer 220 from which the packets are accessible by the recipient.

(d) RX Packet Buffer

At 470 in FIG. 4, in response to detecting second notification 469 from virtual switch 116, VM2 132 may access RX packet buffer 220 (RX-1-2) to receive packets "P1" and "P2," thereby completing the zero-copy packet transmission from VM1 131 to VM2 132. According to the zero-copy approach, packets "P1" and "P2" remain in shared memory location 252 that is mapped to both TX packet buffer 210 and RX packet buffer 220, and it is not necessary to copy the packets from one memory location to another.

At 475 in FIG. 4, VM2 132 may further process packets "P1" and "P2" according to any suitable service(s) provided by VM2 132. In practice, the term "service" may refer generally to operation(s) performed by a particular VM, including but not limited to networking service(s) such as firewall, load balancing, network address translation (NAT), intrusion detection, deep packet inspection (DPI), traffic shaping, traffic optimization, packet header enrichment or modification, packet tagging, content filtering, etc. It should be understood that the operation(s) associated with a service may or may not modify the content (e.g., header(s) or payload) of the packets. Note that VM2 132 may be configured to perform non-networking service(s). A zero-copy approach may also be used when performing packet processing at block 475.

At 480 in FIG. 4, virtual switch 116 may perform integrity verification based on the validity of the digest information generated at block 466. This way, virtual switch 116 may detect any malicious activity by sender VM1 131 to reduce the likelihood of VM1 131 corrupting the packets. If yes, VM1 131 may be identified as a malicious sender and segregated. Block 480 may be performed at any time point(s) before VM2 132 completes the processing of packets "P1" and "P2." The time point(s) may be selected randomly.

At 485 in FIG. 4, once packet processing is completed, VM2 132 may generate and send a third notification to virtual switch 116. In response, virtual switch may determine that packets "P1" and "P2" have been received (and processed) by VM2 132 and send a fourth notification (see 486) to VM1 131 accordingly. At 490, based on fourth notification 486, VM1 131 may release or free up buffer space (e.g., sections k=0,1) in TX packet buffer 210 for subsequent packets.

Zero-Copy Packet Transmission (VM3 133 and VM4 134)

Figure 5:
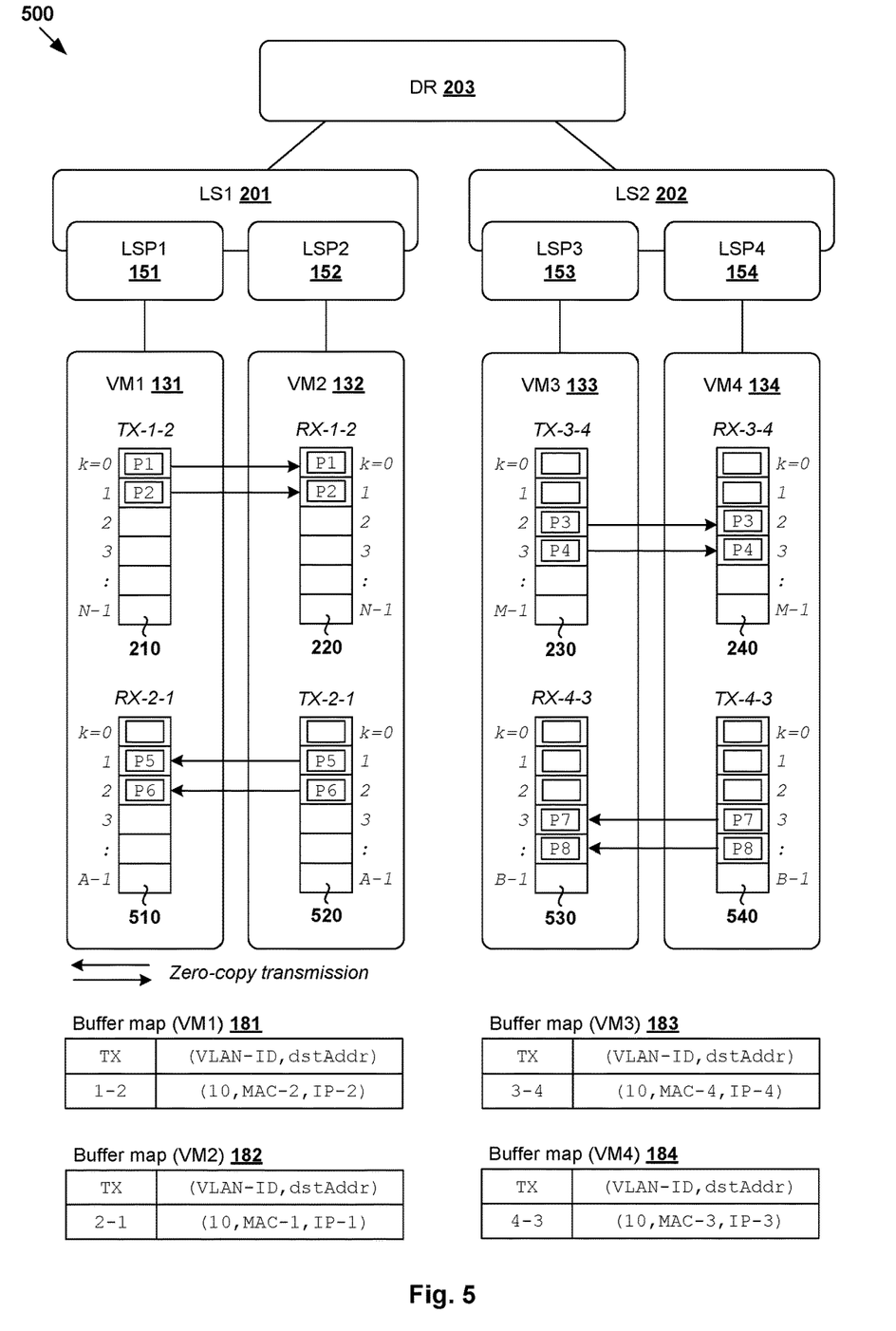
FIG. 5 is a schematic diagram illustrating first examples of zero-copy packet transmission in an SDN environment.

The examples in FIG. 4 may also be implemented to facilitate zero-copy packet transmission between VM3 133 and VM4 134. Similarly, virtual switch 116 may allocate TX packet buffer 230 (see TX-3-4, where i=3 and j=4) to VM3 133 and RX packet buffer 240 (see RX-3-4) to VM4 134. As explained using FIG. 1, packet buffers 230-240 may be mapped to shared memory location 254. As shown in FIG. 5, TX packet buffer 230 and RX packet buffer 240 may each have M sections that are indexed using k=0, . . . , M−1. For the return traffic, virtual switch 116 may allocate TX packet buffer 540 (see TX-4-3) that is writable by VM4 134, and RX packet buffer 530 (see RX-4-3) that is readable by VM3 133. Similarly, packet buffers 530-540 are mapped to the same shared memory location within host physical memory address space 250.

Similarly, VM3 133 (e.g., NIC driver 157) may maintain buffer map 183 that includes entry (TX-3-4, VLAN ID=10, MAC-4, IP-4) that maps its TX buffer 230 to destination VM4 134. For the return traffic, VM4 134 (e.g., NIC driver 158) may maintain buffer map 184 to add an entry that includes entry=(TX-4-3, VLAN ID=10, MAC-3, IP-3) that maps its TX packet buffer 540 to destination VM3 133. During packet transmission, VM3 133 may transmit packets "P3" and "P4" to VM4 134 by writing the packets to its TX buffer 230 (e.g., k=2, 3) for access by virtual switch 116 and subsequent receipt by VM4 134. In this example, note that k=0, 1 of TX buffer 230 are occupied by other packets (not explained in detail for brevity).

Similarly, virtual switch 116 may not assume VM3 133 and VM4 134 are trusted guests, and perform security analysis to check the validity of the packets and their integrity based on relevant digest information. Once packets are transmitted and processed, relevant sections in Various examples discussed using VM1 131 and VM2 132 are also applicable here, and will not be repeated for brevity.

Zero-Copy Packet Transmission (VM1 131 and VM3 133)

Figure 6:
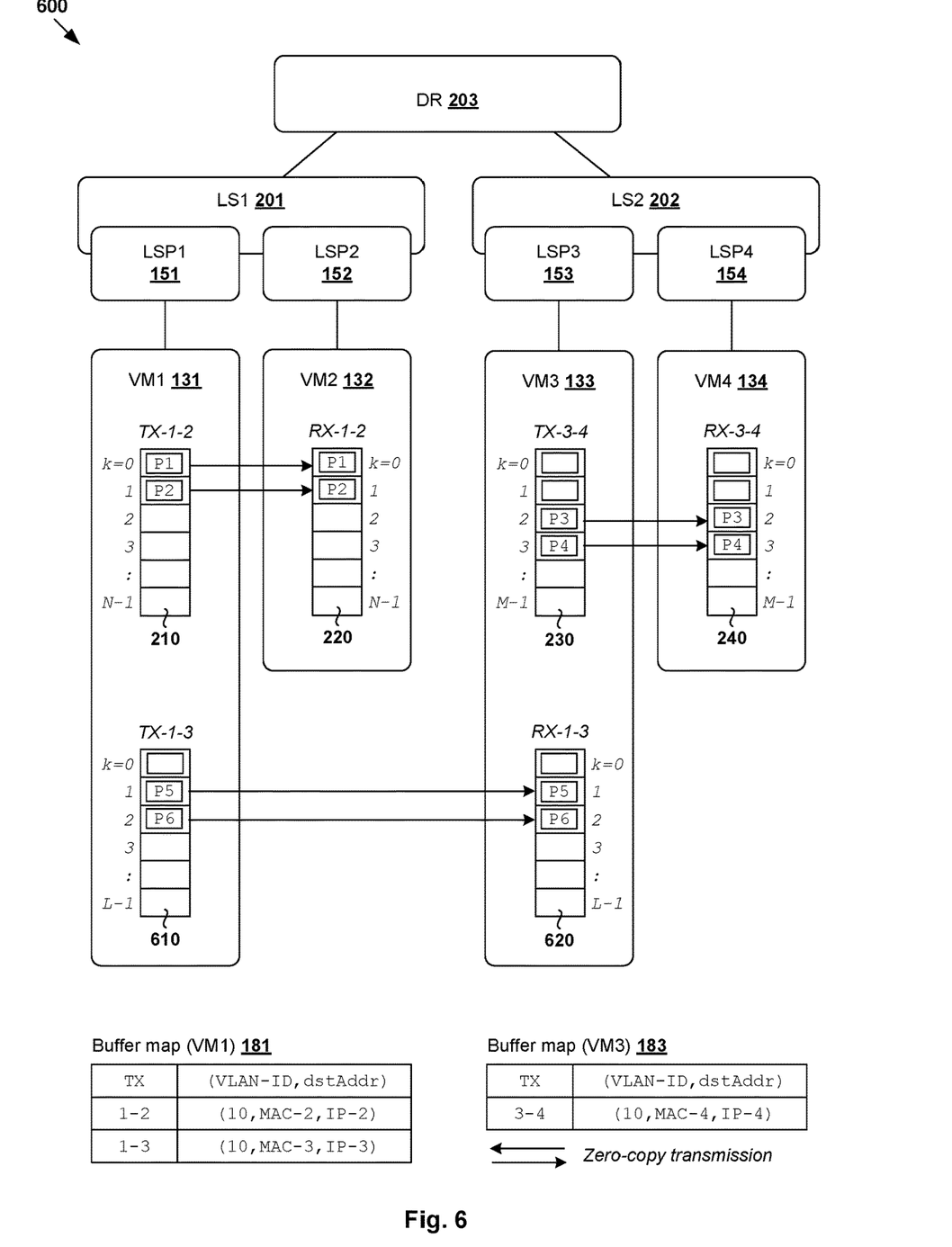
FIG. 6 is a schematic diagram illustrating second examples of zero-copy packet transmission in an SDN environment.

FIG. 6 is a schematic diagram illustrating second examples 600 of zero-packet transmission in SDN environment 100. Here, consider a scenario where source VM1 131 sends packets to multiple destinations, such as VM2 132 and VM3 133. In this case, in addition to first TX packet buffer 210 (TX-1-2) for a first packet flow to VM2 132, virtual switch 116 may allocate VM1 131 with second TX packet buffer 610 (TX-1-3) for a second packet flow to VM3 133. At the destination, virtual switch 116 may allocate VM3 133 with RX packet buffer 620 (RX-1-3) to receive packets from VM1 131. Both TX packet buffer 610 and RX packet buffer 620 are mapped to the same physical memory location to implement a zero-copy mechanism.

To keep track of different packet buffers, VM1 131 may maintain buffer 181 specifying first entry=(TX-1-2, VLAN ID=10, MAC-2, IP-2) associated with first TX packet buffer 210 and second entry=(TX-1-3, VLAN ID=10, MAC-3, IP-3) associated with second TX packet buffer 610. During packet transmission, block 450 may involve VM1 131 selecting between packet buffers 210, 610 by matching destination address information=(VLAN ID=10, MAC-3, IP-3) in packets "P5" and "P6" destined for VM3 133 to the second entry. For example, VM1 131 may transmit packets "P5" and "P6" to VM3 133 by writing packets "P5" and "P6" to its TX buffer 610 (e.g., k=1,2) for access by virtual switch 116 and subsequent receipt by VM3 133.

Similar to the example in FIG. 5, virtual switch 116 may assume VM1 131 and VM3 133 are untrusted and verify packet integrity using digest information according to blocks 460 and 480. In practice, block 460 be performed to detect various issues. A first issue is when a source VM attempts to send packets to invalid destination MAC/IP address. In this case, virtual switch 116 will not allocate new ring buffer based on its resource policy. A second issue is that the source VM does not choose the correct TX packet buffer for packet transmission, such as using incorrect TX packet buffer 210 (TX-1-2) to send packets to VM2 132 instead of VM3 133. In this case, virtual switch 116 may identify VM1 131 to be a malicious sender and segregate VM1 131. The first malicious packet might arrive at the destination VM, but the source VM should be segregated to stop further malicious packets from reaching the destination. Packet integrity check based on digest information also reduces the likelihood of source VM corrupting packets. Various examples discussed using FIG. 5 are also applicable here, and will not be repeated for brevity.

Container Implementation

Although explained using VMs 131-134, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-

134. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform zero-copy packet transmission, wherein the host supports a forwarding element, a first virtualized computing instance and a second virtualized computing instance, and the method comprises:
    allocating a transmit (TX) packet buffer to the first virtualized computing instance and a receive (RX) packet buffer to the second virtualized computing instance, wherein the TX packet buffer and the RX packet buffer are both mapped to a shared memory location associated with the host;
    accessing, by the first virtualized computing instance, the TX packet buffer to store a packet in the shared memory location, the packet being addressed from the first virtualized computing instance to the second virtualized computing instance;
    processing, by the forwarding element connecting the first virtualized computing instance and the second virtualized computing instance, the packet in the shared memory location; and
    accessing, by the second virtualized computing instance, the RX packet buffer to receive the packet stored in the shared memory location.

2. The method of claim 1, wherein accessing the TX packet buffer comprises:
    selecting, from multiple TX packet buffers allocated to the first virtualized computing instance, the TX packet buffer based on destination address information associated with the second virtualized computing instance.

3. The method of claim 2, wherein accessing the TX packet buffer comprises:
    accessing a buffer map storing an association between the TX packet buffer and the destination address information, the packet buffer map being maintained by a network interface controller (NIC) driver supported by a guest operating system associated with the first virtualized computing instance.

4. The method of claim 1, wherein allocating the TX packet buffer and RX packet buffer comprises:
    determining that buffer allocation is required based on one or more of the following: (a) detecting a prior packet that is sent from the first virtualized computing instance to the second virtualized computing instance and (b) detecting that a packet-related metric exceeds a predetermined threshold.

5. The method of claim 1, wherein processing by the forwarding element comprises:
    processing, by the forwarding element, the packet in response to detecting a first notification from the first virtualized computing instance; and
    sending a second notification to the second virtualized computing instance to cause the second virtualized computing instance to access the RX packet buffer.

6. The method of claim 5, wherein processing by the forwarding element comprises:

generating digest information associated with the packet prior to sending the second notification; and based on the digest information, performing integrity verification to determine whether the packet or the first virtualized computing instance is malicious.

7. The method of claim 1, wherein processing by the forwarding element comprises:

detecting a third notification indicating that the packet has been received or processed by the second virtualized computing instance; and generating and sending a fourth notification to cause the first virtualized computing instance to release buffer space storing the packet in the TX packet buffer.

8. A non-transitory computer-readable storage medium that includes a set of instructions which, in response to execution by a processor of a host, cause the processor to perform a method of zero-copy packet transmission, wherein the host supports a forwarding element, a first virtualized computing instance and a second virtualized computing instance, and the method comprises:

allocating a transmit (TX) packet buffer to the first virtualized computing instance and a receive (RX) packet buffer to the second virtualized computing instance, wherein the TX packet buffer and the RX packet buffer are both mapped to a shared memory location associated with the host;

accessing, by the first virtualized computing instance, the TX packet buffer to store a packet in the shared memory location, the packet being addressed from the first virtualized computing instance to the second virtualized computing instance;

processing, by the forwarding element connecting the first virtualized computing instance and the second virtualized computing instance, the packet in the shared memory location; and accessing, by the second virtualized computing instance, the RX packet buffer to receive the packet stored in the shared memory location.

9. The non-transitory computer-readable storage medium of claim 8, wherein accessing the TX packet buffer comprises:

selecting, from multiple TX packet buffers allocated to the first virtualized computing instance, the TX packet buffer based on destination address information associated with the second virtualized computing instance.

10. The non-transitory computer-readable storage medium of claim 9, wherein accessing the TX packet buffer comprises:

accessing a buffer map storing an association between the TX packet buffer and the destination address information, the packet buffer map being maintained by a network interface controller (NIC) driver supported by a guest operating system associated with the first virtualized computing instance.

11. The non-transitory computer-readable storage medium of claim 8, wherein allocating the TX packet buffer and RX packet buffer comprises:

determining that buffer allocation is required based on one or more of the following: (a) detecting a prior packet that is sent from the first virtualized computing instance to the second virtualized computing instance and (b) detecting that a packet-related metric exceeds a predetermined threshold.

12. The non-transitory computer-readable storage medium of claim 8, wherein processing by the forwarding element comprises:

processing, by the forwarding element, the packet in response to detecting a first notification from the first virtualized computing instance; and sending a second notification to the second virtualized computing instance to cause the second virtualized computing instance to access the RX packet buffer.

13. The non-transitory computer-readable storage medium of claim 12, wherein processing by the forwarding element comprises:

generating digest information associated with the packet prior to sending the second notification; and based on the digest information, performing integrity verification to determine whether the packet or the first virtualized computing instance is malicious.

14. The non-transitory computer-readable storage medium of claim 8, wherein processing by the forwarding element comprises:

detecting a third notification indicating that the packet has been received or processed by the second virtualized computing instance; and generating and sending a fourth notification to cause the first virtualized computing instance to release buffer space storing the packet in the TX packet buffer.

15. A computer system, comprising:

a processor; and a non-transitory computer-readable medium having stored thereon instructions that, when executed by the processor, cause the processor to:

allocate a transmit (TX) packet buffer to a first virtualized computing instance and a receive (RX) packet buffer to a second virtualized computing instance, wherein the TX packet buffer and the RX packet buffer are both mapped to a shared memory location associated with the computer system;

access, by the first virtualized computing instance, the TX packet buffer to store a packet in the shared memory location, the packet being addressed from the first virtualized computing instance to the second virtualized computing instance;

process, by a forwarding element connecting the first virtualized computing instance and the second virtualized computing instance, the packet in the shared memory location; and access, by the second virtualized computing instance, the RX packet buffer to receive the packet stored in the shared memory location.

16. The computer system of claim 15, wherein the instructions for accessing the TX packet buffer cause the processor to:

select, from multiple TX packet buffers allocated to the first virtualized computing instance, the TX packet buffer based on destination address information associated with the second virtualized computing instance.

17. The computer system of claim 16, wherein the instructions for accessing the TX packet buffer cause the processor to:

access a buffer map storing an association between the TX packet buffer and the destination address information, the packet buffer map being maintained by a network interface controller (NIC) driver supported by a guest operating system associated with the first virtualized computing instance.

18. The computer system of claim 15, wherein the instructions for allocating the TX packet buffer and RX packet buffer cause the processor to:

determine that buffer allocation is required based on one or more of the following: (a) detecting a prior packet that is sent from the first virtualized computing instance to the second virtualized computing instance and (b) detecting that a packet-related metric exceeds a predetermined threshold.

19. The computer system of claim 15, wherein the instructions for processing by the forwarding element cause the processor to:
   process, by the forwarding element, the packet in response to detecting a first notification from the first virtualized computing instance; and
   send a second notification to the second virtualized computing instance to cause the second virtualized computing instance to access the RX packet buffer.

20. The computer system of claim 19, wherein the instructions for processing by the forwarding element cause the processor to:
   generate digest information associated with the packet prior to sending the second notification; and
   based on the digest information, performing integrity verification to determine whether the packet or the first virtualized computing instance is malicious.

21. The computer system of claim 15, wherein the instructions for processing by the forwarding element cause the processor to:
   detect a third notification indicating that the packet has been received or processed by the second virtualized computing instance; and
   generate and send a fourth notification to cause the first virtualized computing instance to release buffer space storing the packet in the TX packet buffer.

* * * * *